(12) United States Patent
Beckman

(10) Patent No.: US 7,088,657 B1
(45) Date of Patent: Aug. 8, 2006

(54) OPTICAL MEDIA INTEGRITY DETECTION

(75) Inventor: Jerry L. Beckman, Elk Point, SD (US)

(73) Assignee: Gateway, Inc., Irvine, CA (US)

( * ) Notice: Subject to any disclaimer, the term of this patent is extended or adjusted under 35 U.S.C. 154(b) by 216 days.

(21) Appl. No.: 09/965,353

(22) Filed: Sep. 27, 2001

(51) Int. Cl.
*G11B 7/00* (2006.01)

(52) U.S. Cl. .............................. 369/53.15; 369/53.12; 369/53.17; 369/47.44

(58) Field of Classification Search .............. 369/44.26, 369/53.15, 53.12, 53.14, 53.17, 47.44
See application file for complete search history.

(56) References Cited

U.S. PATENT DOCUMENTS 5,867,461 A * 2/1999 Baas ........................ 369/44.32

OTHER PUBLICATIONS

"Clover Systems—Summary of Products: A Quick Review", http://www.cloversystems.com/lit.html, Copyright 1997–2000 Clover Systems, Laguna Hills, CA 92653, 5 pages, (last modified Apr.).

"Welcome to Media Sciences—Interchangeable Media for Computer Mass Storage", http://www.mscience.com/, Media Sciences, Inc., Marlborough, MA 01752–3527, 9 pages.

Cherry, B., "Repairing Scratched CDs", http://www.banjo.com/Articles/021096.html, Copyright 1996, Bob Cherry, 2 pages, (Feb. 1996).

Woodrough, R., "Keeping an eye on optical disks", *Sensor Review(UK)*, vol. 9, No. 1, Jan. 1989, ISSN–0260–2288, (Abstract only—1 p, (Jan. 1989).

* cited by examiner

*Primary Examiner*—Nabil Hindi

(57) ABSTRACT

An optical media drive contains light reflective surfaces positioned about a transparent center portion of the optical media. The light reflective surfaces reflect laser light from a laser unit of the drive which is directed toward the transparent center portions of the optical media. Defects such as cracks in the optical media disturb the reflection. The disturbance is detected by a laser lens and represented by a signal corresponding to the size of the defect. Information about the cracks is used to determine a safe spin rate for the optical media.

20 Claims, 4 Drawing Sheets

OPTICAL MEDIA INTEGRITY DETECTION

FIELD OF THE INVENTION

The invention relates generally to optical drives, and in particular to detecting the structural integrity of optical media.

BACKGROUND OF THE INVENTION

Optical media typically come in the form of a round disc, which is spun in a drive device. The surface of the optical media is read by a laser device which moves radially about the disc as the disc spins to read data on the disc. Spin rates of the media have greatly increased since the original design. CD-ROM drives now have spin rates of 60 times the original spin rate. Such rates are still increasing.

High spin rates create destructive forces on optical media discs. If the discs have cracks or other structural integrity defects, they can break apart in the drive, destroying the disc, and harming the drive. The higher speed drives are both more expensive, and more likely to cause a disc to break apart, increasing the likelihood of catastrophic failure of both the disc and the drive.

SUMMARY OF THE INVENTION

An optical media drive detects structural or mechanical defects in optical media. The drive contains light reflective surfaces positioned above an inner transparent center portion of the optical media. The light reflective surfaces reflect laser light from a laser in the drive which is directed toward the transparent center portions of the optical media. Defects, such as cracks in the transparent center portion of the optical media disturb the reflection. The disturbance is detected by a laser lens and converted to a signal representing the size of the defect.

In one embodiment, the transparent center portion of the optical media is an inner ring having an inner vertical edge, and horizontal portion extending radially from the inner vertical edge to a data portion. An upper clamping plate of the drive has a mirror on a side that clamps the central portion of the optical media, and a transparent lower plastic plate. Each of the mirrors is positioned to reflect light from the laser back to the laser lens.

The laser of the drive is first focused proximate the inner vertical edge. When reflection from the mirror is detected, the media is spun at a low rpm rate, such as 1× as used in CD-ROM drives. Cracks in the inner ring of the media will disrupt the reflection received by the laser lens, causing the converted electrical output signal to indicate a gap in reflection similar to data pits on the data portion of the optical media. Such gaps are normally many times the size of a data pit in the media. The length of the disruptions of the signal represents the width of the crack.

The disc is rotated and the laser is moved from the inner to the outer circumference of the transparent inner ring. Information about cracks is collected, such as the length of a crack. The information about the cracks is used to determine a safe spin rate for the optical media. With small cracks, it may still be safe to spin the media at high rates. With larger cracks, slower spin rates are used. The lower spin rates reduce the risk of using media that has suspect integrity, but still allows the use of such media.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention comprises an optical media drive and software operable to detect integrity problems with optical media, such as cracks which might lead to failure of the media and possible damage to the media drive. Cracks usually start near a center hole of an optical media disc. Optical media discs include laser discs, CD ROM, DVD and other types of discs that are rotated within a disc drive and read by a light source such as a laser.

Figure 1:
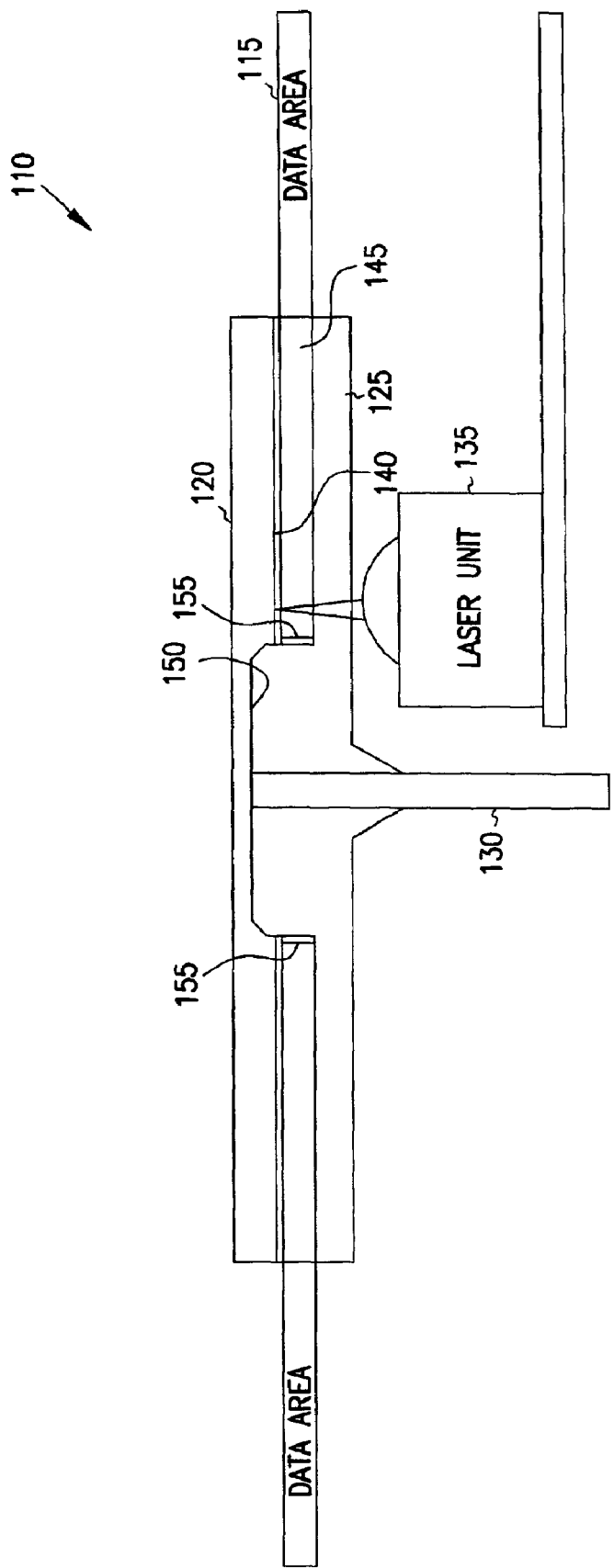
FIG. 1 is a block schematic diagram of an optical media reading device.

A portion of a disc drive device is indicated generally at 110 in FIG. 1. An optical media is shown in the disc drive at 115. It is held in place by an upper clamper plate 120 and a lower clamper plate 125. The clamper plates and disc are rotated via a spindle 130, about which the disc and clamper plates are centered. A laser unit 135 is used to read data from an outer data portion of the disc 115.

In one embodiment of the invention, the laser unit 135 has enhanced focus capability enabling it to focus past the normal distance of data pits, typically about 1–2 mm past such normal distance. The center ring portion is the portion of the disc that is clamped by the upper and lower clamper plates, and is transparent. The lower clamper plate 125 is also transparent, allowing light from the laser unit 135 to pass, allowing light to be reflected by mirrors positioned on the underside of the upper clamper plate 120. The term "transparent" refers to multiple gradations of transparency, from near lossless transmission of light to losses that permit enough light to return to the laser unit and be detected by a laser lens device.

A mirror 140 is supported by the upper clamper plate 120 proximate an inner horizontal ring portion 145 of the disc 115. In operation, the laser unit begins by directing light toward the inner horizontal ring portion closest to an inner vertical edge 155 of the disc 115, and receives light reflected back from the mirror. The laser progresses from the inner vertical edge 155 towards the outer vertical edge of the lower clamper plate 125 and the upper clamper plate 120.

Figure 2:
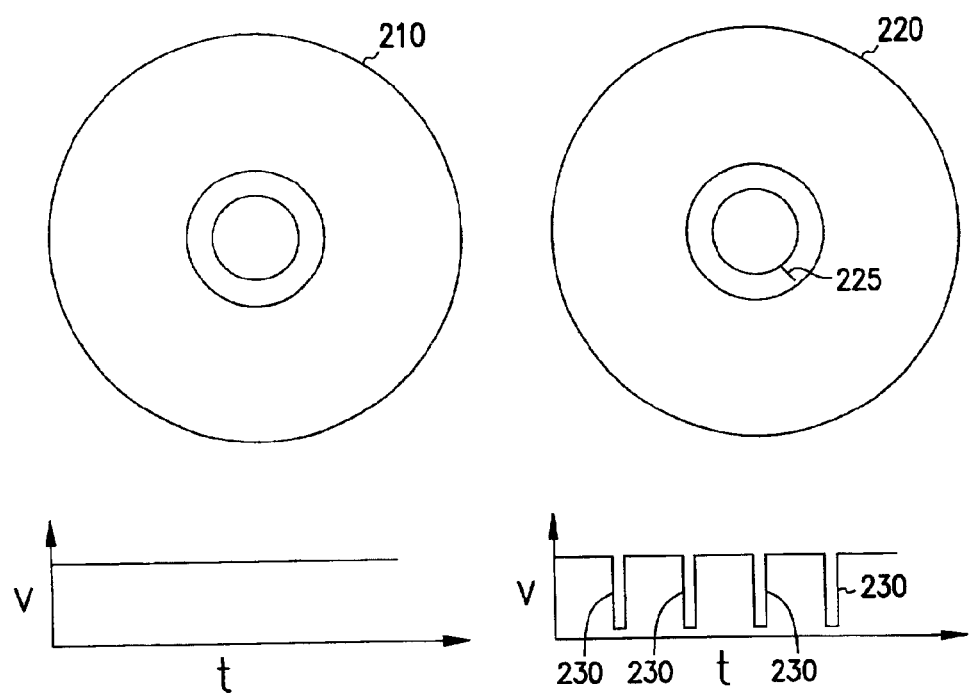
FIG. 2 is a representation of an optical media with and without cracks in combination with a graph of an output signal of the reading device of FIG. 1.

FIG. 2 is a diagram showing a signal output from the laser lens for a disc 210 with no cracks, and a disc 220 with one crack indicated at 225 on the inner portion of the disc. Graphs of the electrical output signal provided by the laser unit is shown below each corresponding disc. The signal from the disc 210 with no cracks is a flat line. In other words, a constant, uninterrupted reflection is observed at the laser lens. The signal from disc 220 shows repetitive drop offs 230 in the signal, corresponding to crack 225 as the crack rotates past the laser unit. The crack reduces the amount of light reflected, and is interpreted similarly to a data pit on the data portion of the disc, without modification to the disc drive laser circuitry. Since a crack is much larger than a normal data pit, it shows up as a significant loss of signal as shown in FIG. 2 at 230. The length of the loss of signal is related to the severity of the crack, and can be from several data pit lengths to several hundred thousand data pit lengths.

Figure 3:
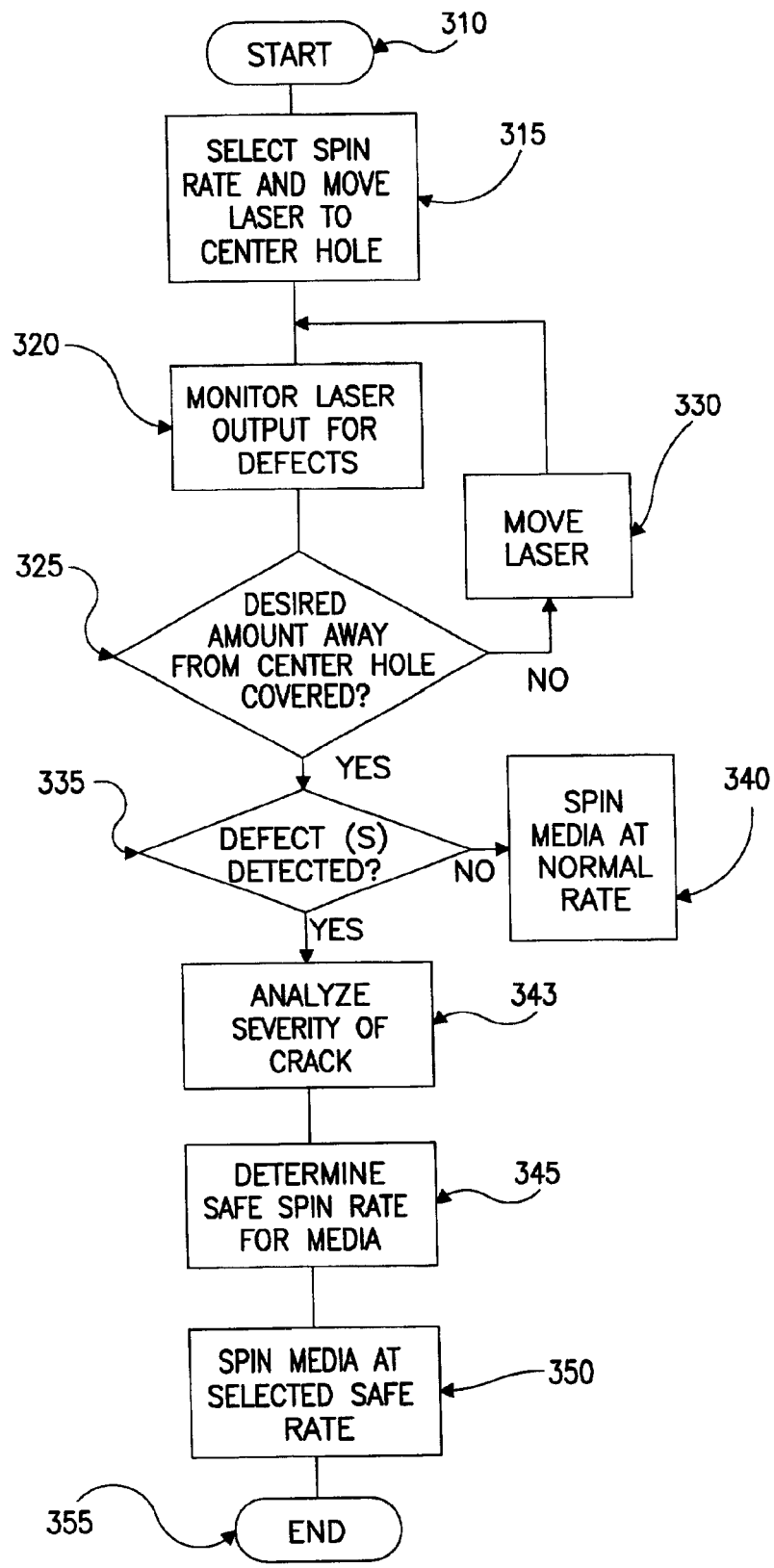
FIG. 3 is a flowchart illustrating a method of checking optical media for defects.

FIG. 3 is a flowchart of a method of detecting cracks in an optical disc using the above modified disc drive. The method in one embodiment is implemented in computer programming code stored on a computer readable medium. It is embodied in a device driver for running on a host processor, or may also be executed on a local processor in the disc drive itself, with messages passed back to the host for display to a user regarding the status of the disc.

When a disc is inserted into the disc drive at 310, a slow spin rate is selected at 315 that is not likely to harm a defective disc, such as 1×for a CD ROM type of drive. The laser is commanded to focus the laser beam into a top corner near the inside vertical edge of the horizontal surface. When a reflection of the light is detected, the disc begins to spin. The laser lens output is then provided to a processor for detecting defects at 320. If the disc is not cracked, the laser lens receives a constant and steady reflected beam. The beam is converted to an electrical signal that is sent to a processor for analysis. In a further embodiment, once a defect is detected, no more checking is done, and results are returned to a processor.

If no defects have been detected near the vertical edge of the disc after one or more revolutions of the disc, the beam is moved incrementally from the top corner of the vertical edge to the horizontal surface area away from the center hole until the data zone is reached. The length of the increments may be varied. In one embodiment, the increment corresponds to about 10 data tracks in width. In a further embodiment, the increments are approximately 10 microns. Other increments may also be used without departing from the scope of the invention.

If a defect has not been detected as determined at 335, the drive is instructed to run at a normal spin rate at 340. If a defect has been detected, the severity of the structural or mechanical defect is analyzed at 343, and a safe spin rate if any is determined at 345. Since the size of the crack or cracks is represented by the signal from the laser lens, empirical measurements are used to determine a safe spin rate at 345, and the disc is then spun at that rate at 350 and processing ends at 355. The size of the crack is measured as a width along a circumference of the disc. In further embodiments, the size of the crack includes the radial length of the crack corresponding to detection of the crack as the laser is moved one or more increments.

In one embodiment, an interrupt is generated, and a user of a computer system is provided a pop-up window alerting the user to the condition of the disc, and allowing the user to select whether or not to continue to use the disc at the lower safe rate, such as down to a 1× rate. The choice provides the user the ability to not continue in the event of degraded performance of some CDs or DVDs at slow rates.

Figure 4:
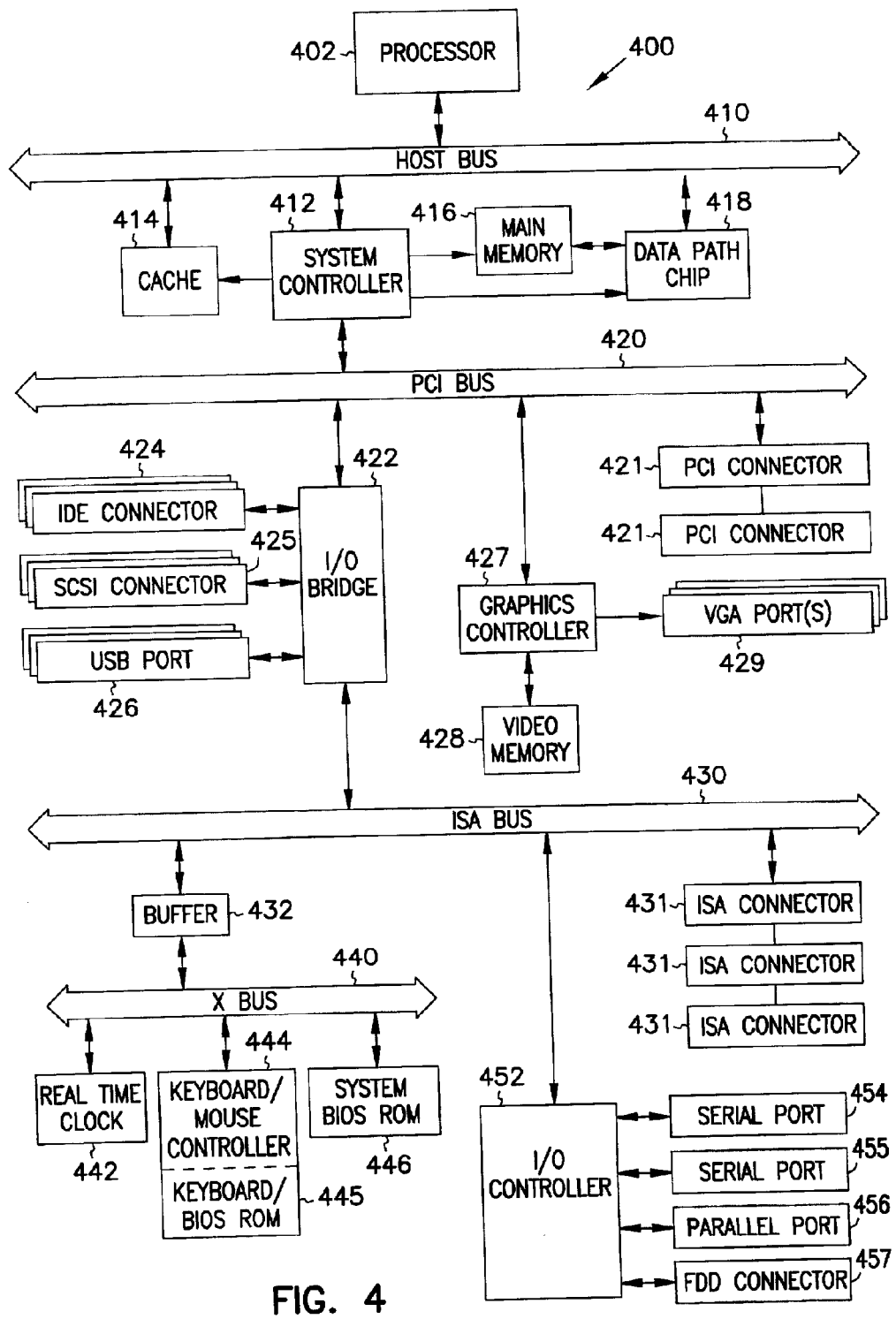
FIG. 4 is a block diagram of a computer system to which the optical media reading device of FIG. 1 is attached.

FIG. 4 shows a block diagram of a personal computer system. The personal computer system is capable of executing methods associated with detection of cracks in optical media. The methods are expressed in computer programming language stored on computer readable medium such as diskette, CD, tape, carrier waves, etc.

FIG. 4 shows a more detailed block diagram of a personal computer system 400 according to the present invention. Personal computers come in all shapes and sizes, from hand held personal digital assistants to laptop, portable, desktop, tower and rack configurations. Such computers are also programmable with personal information, including customization data. Customization data includes data such as color schemes and cursor response controls as well as many others. Personal information is transferred in the same manner as described above in the following personal computer embodiment.

In this embodiment, a processor 402, a system controller 412, a cache 414, and a data-path chip 418 are each coupled to a host bus 410. Processor 402 is a microprocessor such as a 486-type chip, a Pentium®, Pentium II®, Pentium III®, Pentium®4, or other suitable microprocessor. Cache 414 provides high-speed localmemory data (in one embodiment, for example, 512 kB of data) for processor 402, and is controlled by system controller 412, which loads cache 414 with data that is expected to be used soon after the data is placed in cache 412 (i.e., in the near future). Main memory 416 is coupled between system controller 414 and data-path chip 418, and in one embodiment, provides random-access memory of between 16 MB and 128 MB of data. In one embodiment, main memory 416 is provided on SIMMs (Single In-line Memory Modules), while in another embodiment, main memory 416 is provided on DIMMs (Dual In-line Memory Modules), each of which plugs into suitable sockets provided on a motherboard holding many of the other components shown in FIG. 4. Main memory 416 includes standard DRAM (Dynamic Random-Access Memory), EDO (Extended Data Out) DRAM, SDRAM (Synchronous DRAM), or other suitable memory technology. System controller 412 controls PCI (Peripheral Component Interconnect) bus 420, a local bus for system 400 that provides a high-speed data path between processor 402 and various peripheral devices, such as graphics devices, storage drives, network cabling, etc. Data-path chip 418 is also controlled by system controller 412 to assist in routing data between main memory 416, host bus 410, and PCI bus 420.

In one embodiment, PCI bus 420 provides a 32-bit-wide data path that runs at 33 MHz. In another embodiment, PCI bus 420 provides a 64-bit-wide data path that runs at 33 MHz. In yet other embodiments, PCI bus 420 provides 32-bit-wide or 64 bit-wide data paths that runs at higher speeds. In one embodiment, PCI bus 420 provides connectivity to I/O bridge 422, graphics controller 427, and one or more PCI connectors 421 (i.e., sockets into which a card edge may be inserted), each of which accepts a standard PCI card. In one embodiment, I/O bridge 422 and graphics controller 427 are each integrated on the motherboard along with system controller 412, in order to avoid a board-connector-board signal-crossing interface and thus provide better speed and reliability. In the embodiment shown, graphics controller 427 is coupled to a video memory 428 (that includes memory such as DRAM, EDO DRAM, SDRAM, or VRAM (Video Random-Access Memory)), and drives VGA (Video Graphics Adaptor) port 429. VGA port 429 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 421.

In one embodiment, I/O bridge 422 is a chip that provides connection and control to one or more independent IDE connectors 424–425, to a USB (Universal Serial Bus) port 426, and to ISA (Industry Standard Architecture) bus 430. In this embodiment, IDE connector 424 provides connectivity for up to two standard IDE-type devices such as hard disk drives, CDROM (Compact Disk-Read-Only Memory) drives, DVD Digital Video Disk) drives, or TBU (Tape-Backup Unit) devices. In one similar embodiment, two IDE connectors 424 are provided, and each provide the EIDE (Enhanced IDE) architecture. In the embodiment shown, SCSI (Small Computer System Interface) connector 425 provides connectivity for up to seven or fifteen SCSI-type devices (depending on the version of SCSI supported by the embodiment). In one embodiment, I/O bridge 422 provides ISA bus 430 having one or more ISA connectors 431 (in one embodiment, three connectors are provided). In one embodiment, ISA bus 430 is coupled to I/O controller 452, which in turn provides connections to two serial ports 454 and 455, parallel port 456, and FDD (Floppy-Disk Drive) connector 457. In one embodiment, ISA bus 430 is connected to buffer 432, which is connected to X bus 440, which provides connections to real-time clock 442, keyboard/mouse controller 444 and keyboard BIOS ROM Basic Input/Output System Read-Only Memory) 445, and to system BIOS ROM 446.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the invention. It is intended that this invention be limited only by the claims, and the full scope of equivalents thereof

What is claimed:

1. An optical media drive for detecting defects in optical media, the drive comprising:
   a laser and lens for reading information from an optical media, wherein the laser is directable to an inner ring of the optical media; and
   a mirror disposed about the inner ring of the optical media that reflects light from the laser back to the lens.
2. The drive of claim 1 wherein the lens provides an electrical signal representative of defect in the inner ring of the optical media.
3. The drive of claim 2 and further comprising:
   a selector that selects a spin rate for reading data from the optical media based on the signal from the lens.
4. The drive of claim 3 wherein the selector selects the spin rate based on the size of the defect.
5. The drive of claim 4, wherein the defect is a crack, and the size of the defect corresponds to a width and length of the crack.
6. The drive of claim 3 wherein the selector selects the spin rate based on the size and number of defects detected.
7. The drive of claim 1 wherein the laser is controllable to direct laser light incrementally along a radial length of the inner ring of the optical media.
8. The drive of claim 1 wherein the drive is selected from the group consisting of a DVD drive, CD ROM drive, and laser disc drive.
9. A method of detecting a crack in an optical media disc, the method comprising:
   directing laser light of an optical media disc drive toward a near side of a transparent inner ring of the optical media disc;
   rotating the disc;
   receiving reflected laser light from a mirror proximate a far side of the inner ring of the optical media; and
   generating a signal from the received reflected laser light.
10. The method of claim 9 wherein the mirror extends radially, the length of the transparent inner ring.
11. The method of claim 9 wherein the disc is rotated at a slower rate than a maximum rate of rotation by the disc drive.
12. The method of claim 9 wherein the signal is representative of one or more cracks.
13. The method of claim 12 wherein the signal is representative of the severity of the one or more cracks.
14. The method of claim 13 and further comprising selecting a rate of rotation for reading data on the disc based on the signal representative of the severity of the one or more cracks.
15. The method of claim 13 wherein the severity is related to a width or length of a crack.
16. The method of claim 9 wherein the laser light is directed at different areas on the inner ring of the disc to generate signals representative of radial lengths of cracks in the disc.
17. The method of claim 9 wherein beginning rotation of the disc is dependent on detecting a reflection of the laser light.
18. The method of claim 16 wherein the laser is directed in incremental steps.
19. The method of claim 16 wherein the laser is stopped when a crack is detected.
20. A computer readable medium having instructions stored thereon for causing a computer to execute a method of detecting a crack in an optical media disc, the method comprising:
   directing laser light of an optical media disc drive toward a near side of a transparent inner ring of the optical media disc;
   rotating the disc;
   receiving reflected laser light from a mirror proximate a far side of the inner ring of the optical media; and
   generating a signal from the received reflected laser light.

* * * * *